United States Patent
Cheraso et al.

(10) Patent No.: US 6,212,366 B1
(45) Date of Patent: Apr. 3, 2001

(54) HOUSING ASSEMBLY FOR A SELECTIVE CALL RECEIVER

(75) Inventors: John Philip Cheraso, Boynton Beach; Gregory Paul Cheraso, West Palm Beach, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/032,939

(22) Filed: Mar. 2, 1998

(51) Int. Cl.[7] ................................................. H04B 1/38
(52) U.S. Cl. .......................... 455/90; 455/575; 455/348; 379/440; 220/283; 292/164; 292/152
(58) Field of Search .............................. 455/347, 90, 575, 455/348, 31.1–31.3, 344; 292/152, DIG. 38, DIG. 53, 128, 163, 147; 429/97, 100, 96, 99; 220/345.5, 281–283, 326, 345.3; 379/428, 433, 434, 440, 437, 445, 453

(56) References Cited

U.S. PATENT DOCUMENTS

| | | | |
|---|---|---|---|
| 4,390,198 | * | 6/1983 | Selinko .............................. 292/152 |
| 4,972,508 | * | 11/1990 | King ...................................... 455/90 |
| 5,244,755 | * | 9/1993 | Benoist et al. ........................ 429/97 |
| 5,372,395 | * | 12/1994 | Yang ................................... 292/147 |
| 5,509,704 | * | 4/1996 | Schneider et al. ................... 292/163 |
| 5,535,437 | * | 7/1996 | Karl et al. .............................. 455/90 |
| 5,848,152 | * | 12/1998 | Slipy et al. .......................... 379/433 |
| 5,848,719 | * | 12/1998 | Goldenberg .......................... 220/326 |
| 5,851,692 | * | 12/1998 | Potts ................................... 429/100 |
| 5,884,155 | * | 3/1999 | Wicks et al. ......................... 455/321 |
| 6,073,027 | * | 6/2000 | Norman et al. ...................... 455/550 |

* cited by examiner

*Primary Examiner*—Dwayne Bost
*Assistant Examiner*—Charles Craver

(57) ABSTRACT

A housing assembly (100) includes a housing (101) having a first opening (105), a door (114) coupled to the housing at the first opening, wherein the door is slidable between opened and closed positions with the housing, a first latch (110) coupled to the door, the first latch having a first detent (112), a second latch (104) coupled to the housing, the second latch having an aperture (106) for engaging with the first detent of the first latch in the closed position, and a button (108) coupled to the housing and coupled to the second latch, wherein depression of the button disengages the first and second latches from each other, thereby permitting the door to slide to the opened position. The housing assembly further includes a selective call receiver (200) for receiving messages from a radio communication system.

5 Claims, 8 Drawing Sheets

VIEW A
(REF. FIG. 9)

HOUSING ASSEMBLY FOR A SELECTIVE CALL RECEIVER

FIELD OF THE INVENTION

This invention relates in general to housing assemblies, and particularly, to a housing assembly for a selective call receiver.

BACKGROUND OF THE INVENTION

To satisfy consumer demand for miniaturization of portable consumer products, such as pagers, engineering efforts have generally been focused on reducing the size of printed circuit boards (PCBs) that carry the circuits that operate the pager. Reduction of PCBs has been achieved, in part, by integration of discrete circuit elements into single integrated circuit components. As a result of circuit integration, PCBs, and the housing assemblies carrying them, have been substantially reduced in size.

Reduction in the size of housing assemblies, however, has given rise to new challenges. For example, generally, the housing assembly of a battery operated pager includes a battery door with a lock switch to prevent the battery door from inadvertently opening during normal consumer use. Miniaturization of the housing assembly, however, has over accentuated the unaesthetic feature of the lock switch. Additionally, because of miniaturization, the use of a lock switch has substantially reduced the available room on the surface of the housing assembly for placement of important product features such as, for example, a label for trademark identification.

Accordingly, what is needed is a housing assembly that overcomes the foregoing disadvantages described in the prior art.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
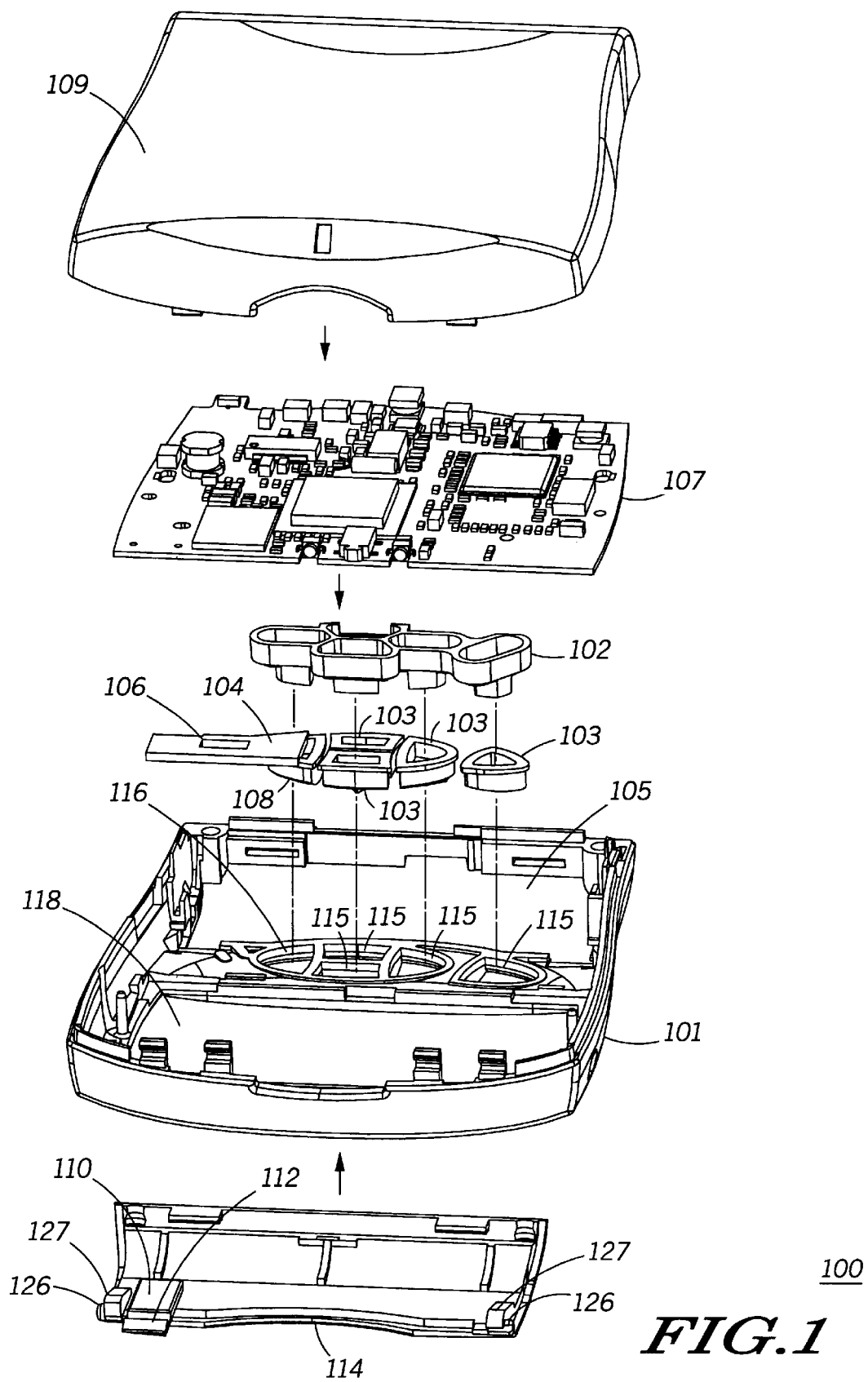
FIGS. 1–2 show a block diagram of a housing assembly according to the present invention.
Figure 2:
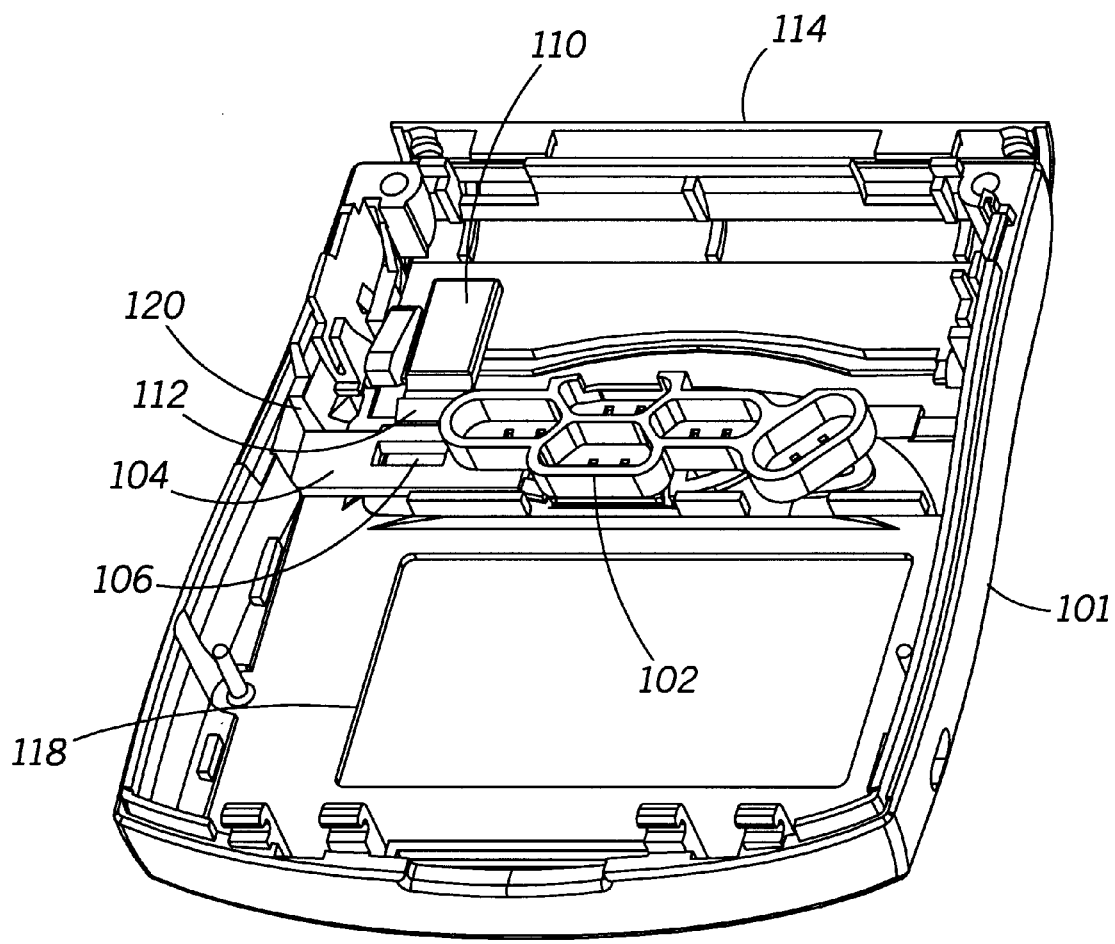

FIGS. 1–2 show a block diagram of a housing assembly 100 according to the present invention. As shown in FIG. 1, the housing assembly 100 comprises a housing 101, a door 114, buttons 108, 103, a spring 102, a PCB (printed circuit board) 107 representative of a selective call receiver, and a cover 109. The housing 101 has a first opening 105 for coupling to the door 114, and further includes openings 115–116 for coupling to the buttons 108, 103, respectively, and opening 118 for coupling to a display (not shown). Button 108 is coupled to a second latch 104 having an aperture 106. The second latch 104 is used for engaging with a detent 112 of a first latch 110 coupled to the door 114. The door 114 further includes upstanding projections 127 each including a hinge pin 126.

The assembly process is as follows. Button 108 is placed in opening 116, while buttons 103 are placed in openings 115. Button 108 is placed in opening 116 in order to position the second latch 104 such that it can engage with the first latch 110 of the door 114. Next, the spring 102 (comprising, for example, an elastomeric material) is positioned above the buttons 103, and on the top surface of the second latch 104. The assembly continues by placing the PCB 107 above the spring 102, and by latching the cover 109 to the housing 101, thereby compressing the PCB 107 against the spring 102. The compression of the PCB 107 against the spring 102 in turn resiliently biases the buttons 108, 103 in their released position by way of the spring 102. The final assembly step comprises placing each hinge pin 126 of the door 114 in recessed channels 130 (see FIGS. 8–9) of the housing 101. FIG. 2 shows the completed housing assembly 100 with the exception of the PCB 107 and the cover 109.

Figure 3:
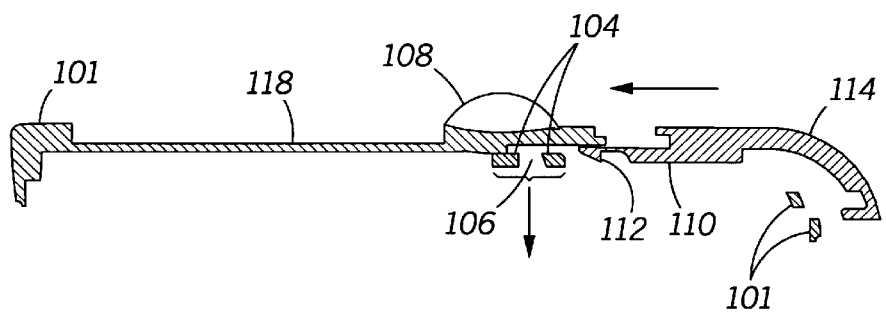
FIGS. 3–7 show a cross-sectional block diagram of a latching mechanism of the housing assembly according to the present invention.
Figure 4:
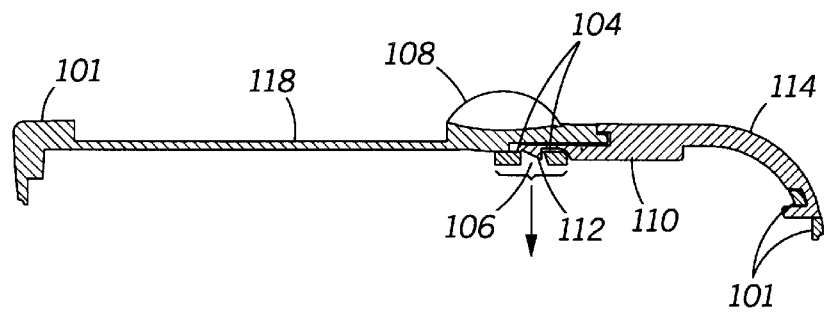

FIGS. 3–7 show a cross-sectional block diagram of the latching mechanism (i.e., the first and second latches 110, 104) of the housing assembly 100 according to the present invention. FIG. 3 is illustrative of the door 114 in the opened position. In this position, the detent 112 of the first latch 110 is disengaged from the aperture 106 of the second latch 104. In order to engage the first and second latches 110, 104, i.e., latch the door 114 in the closed position, the door 114 must be pushed linearly towards the housing 101 as shown. In this direction, the detent 112 of the first latch 110 contacts an edge of the second latch 104 in a manner that forces the second latch 104 in a downward direction as shown. Once the detent 112 of the first latch 110 reaches the aperture 106, the second latch 104 engages with the first latch 110, thereby preventing release of the first latch 110. The result of this process is shown in FIG. 4.

Figure 5:
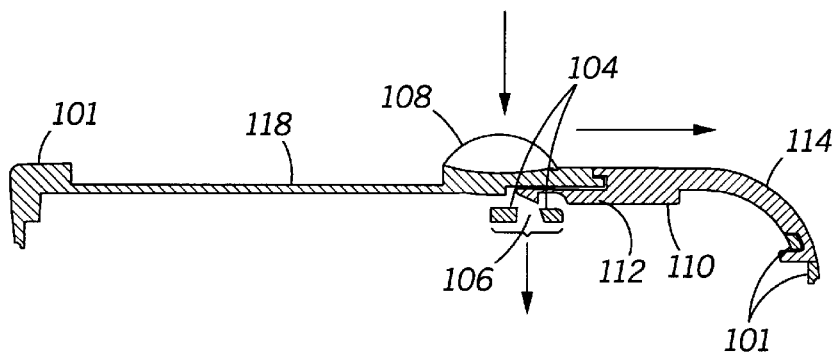
Figure 6:
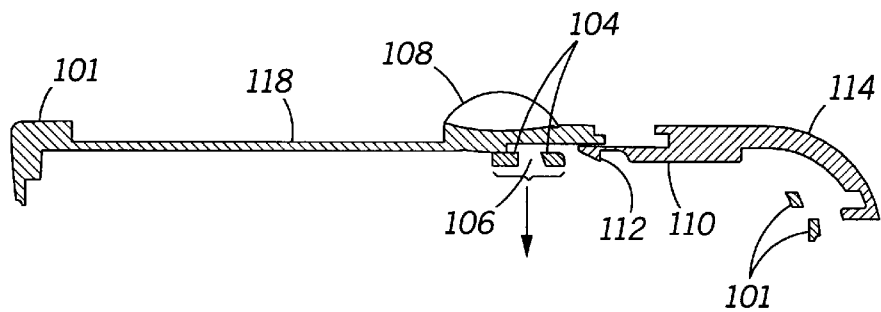

To open the door 114 once it has been latched in the closed position (see FIG. 4), button 108 must be depressed to disengage the first and second latches 110, 104 from each other and, additionally, the door 114 must be pulled outwardly as shown in FIG. 5. The result is shown in FIG. 6. It should be apparent from the descriptions of FIGS. 3–7 that when the door 114 is pulled towards its opened position without depressing button 108, the detent 112 of the first latch 110 will apply a torque to the second latch 104 by way of the aperture 106 (see FIG. 2). To prevent this torque action from rotating button 108 about opening 116 (see FIG. 1), a wall 120 is coupled to the housing 101 orthogonal to the second latch 104 (see FIG. 2).

Figure 7:
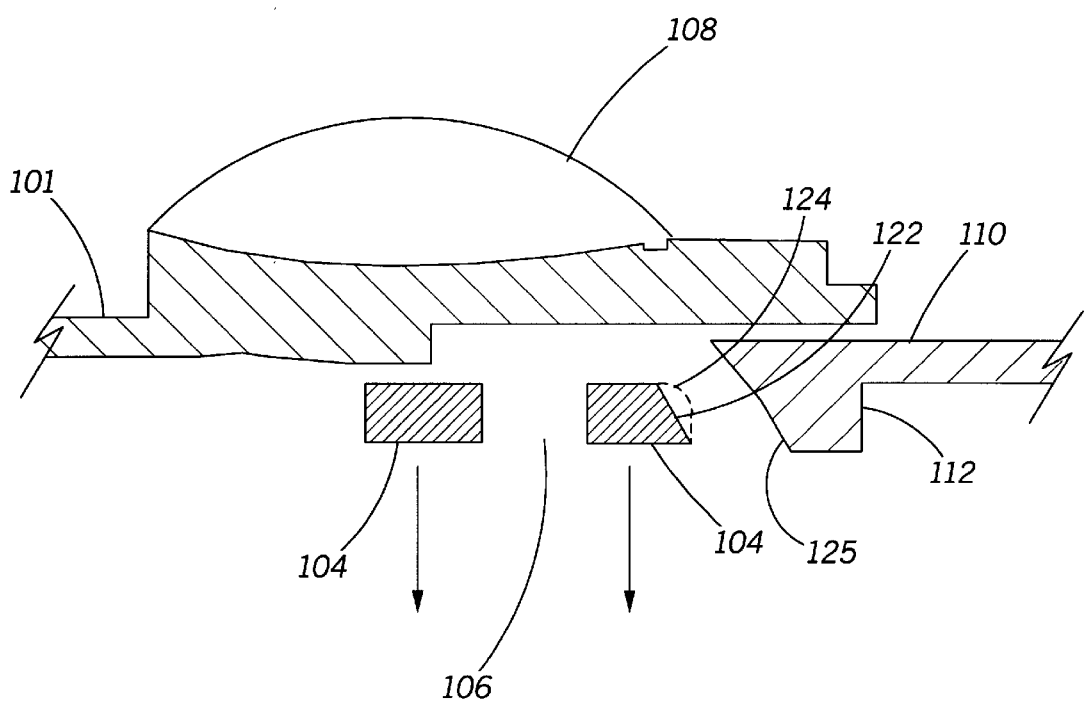

FIG. 7 shows an exploded view of the detent 112 of the first latch 110 and the second latch 104 depicting how the first latch 110 displaces the second latch 104 during engagement. As illustrated in FIG. 7, the side of the second latch 104 adjacent to the detent 112 of the first latch 110 is formed of either a chamfered edge 122 or a radius edge 124. The detent 112 of the first latch 110 is preferably formed of a chamfered edge 125. When the chamfered edge 125 of the first latch 110 comes in contact with either the chamfered edge 122 or the radius edge 124 of the second latch 104, the second latch 104 is forced in a downward direction, thereby providing access of the detent 112 to the aperture 106 for engagement. It will be appreciated by one of ordinary skill in the art that other shapes for these edges suitable to the present invention may be used.

Figure 8:
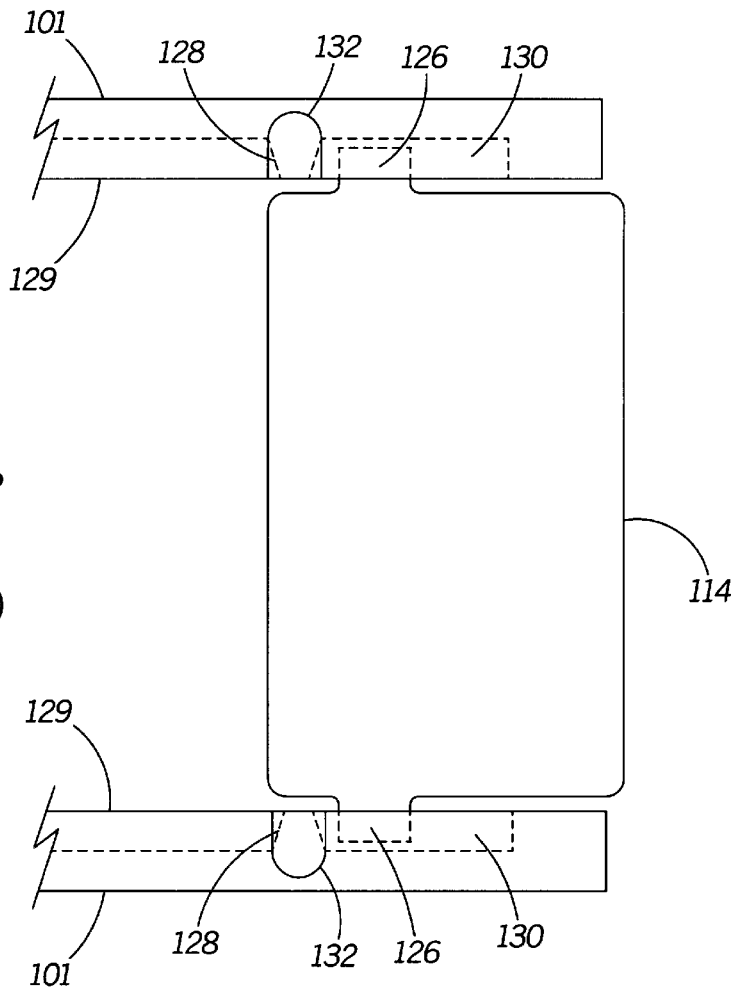
FIGS. 8–9 show a block diagram of a hinge mechanism of the housing assembly according to the present invention.
Figure 9:
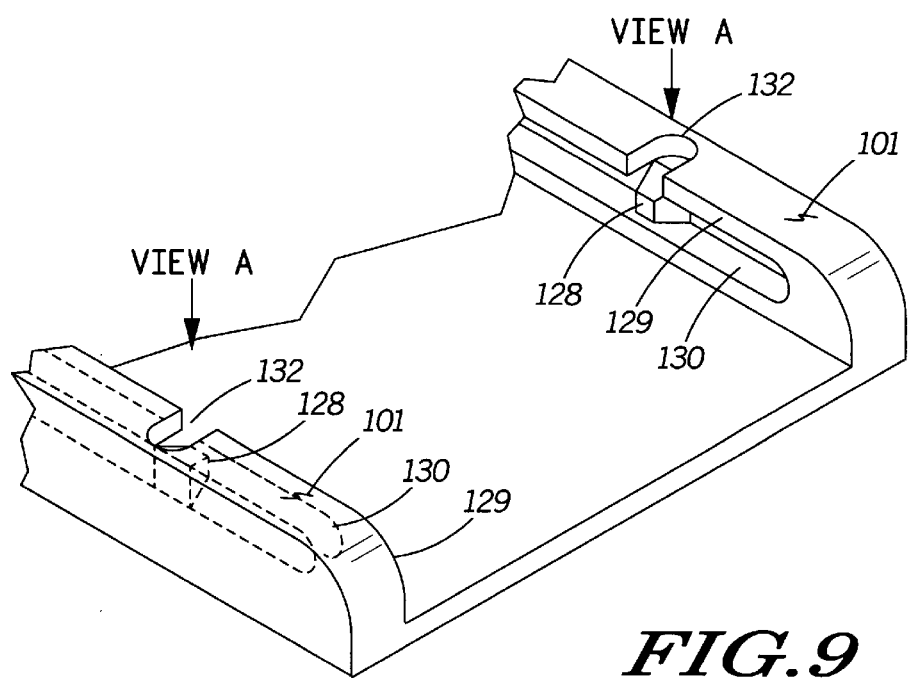

FIGS. 8–9 show a block diagram of the hinge mechanism of the housing assembly 100 according to the present invention. The hinge mechanism comprises a first recessed channel 130 located at the sidewalls 129 at opposite ends of the housing 101, a second detent 128 coupled to the first recessed channel 130 to prevent removal of the door 114 from the housing 101, and a hinge pin 126 located at opposite ends of the door 114 for engaging with the first recessed channel 130 on opposite sides of the housing 101. The hinge mechanism further comprises a second recessed channel 132 coupled orthogonal to the first recessed channel 130 and preferably only on one side of the housing 101. By positioning the hinge pin 126 at the second recessed channel 132, the hinge pin 126 may be removed from the second recessed channel 132, thereby permitting removal of the door 114 from the housing 101. FIG. 8 is a cross-sectional view of FIG. 9 illustrating the elements of the hinge mechanism.

Figure 10:
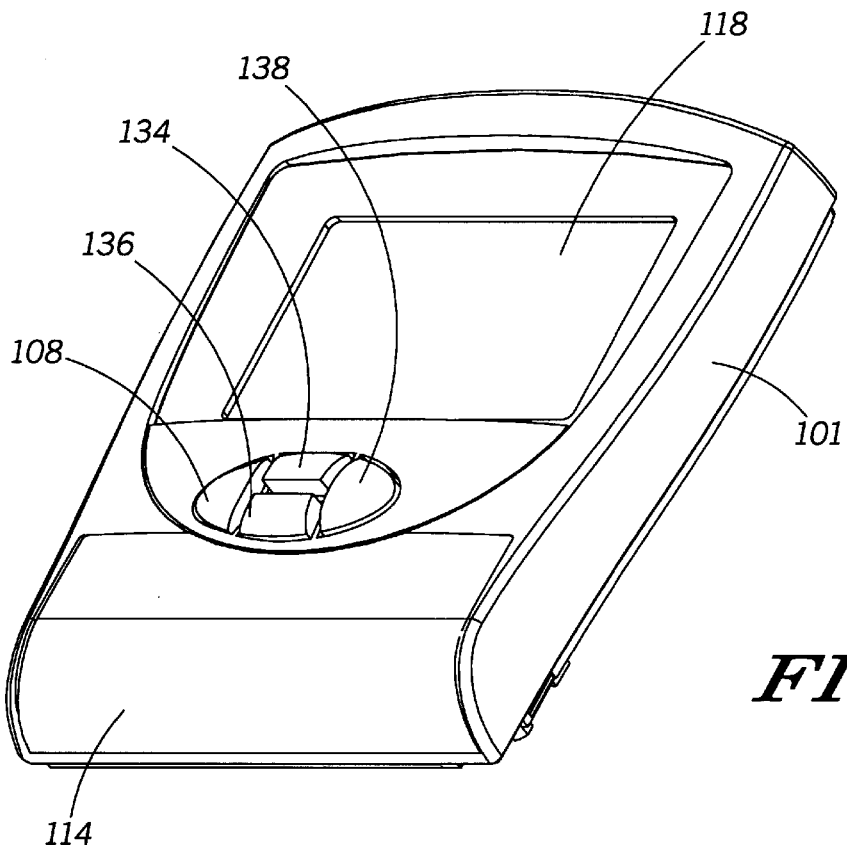
FIGS. 10–12 show a block diagram of the housing assembly with a door in closed, opened, and pivoting positions, respectively, according to the present invention.
Figure 11:
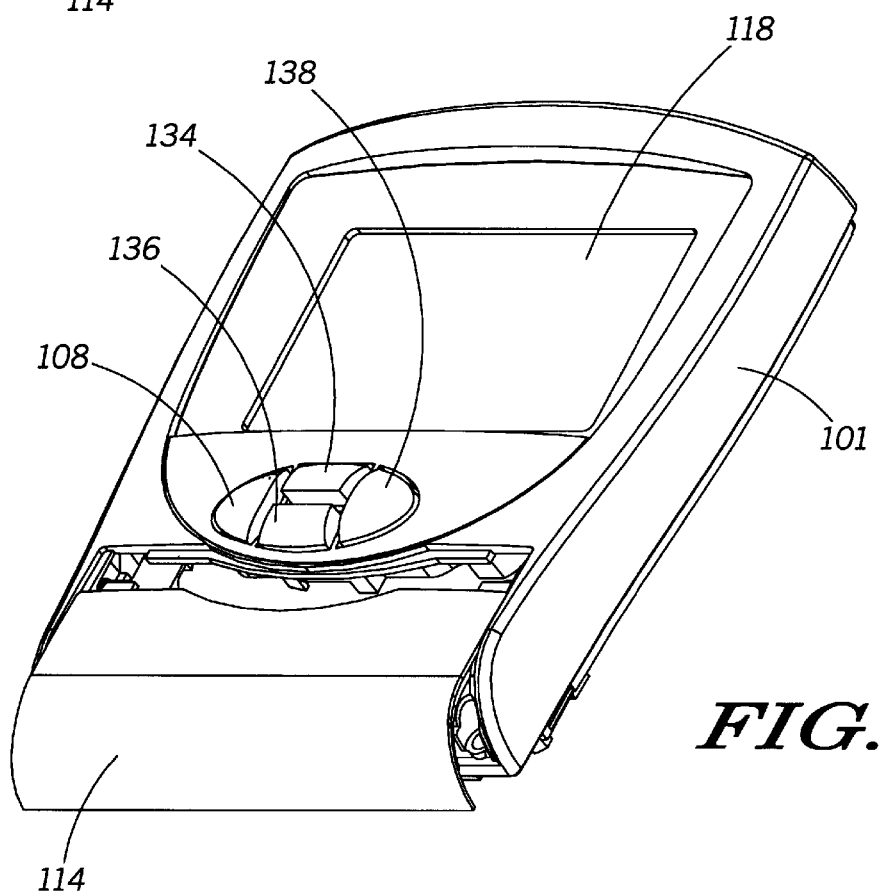
Figure 12:
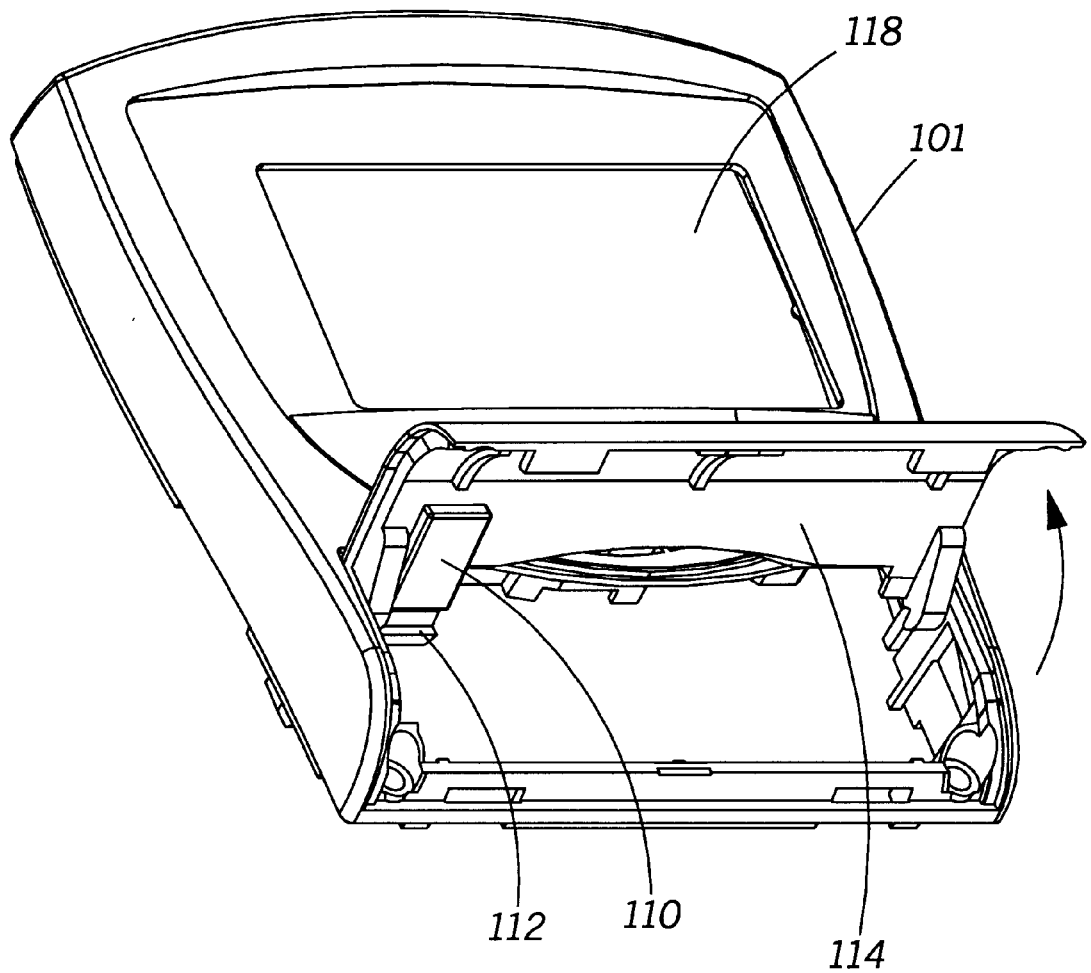

From the illustrations of FIGS. 8–9 it should be evident that once the hinge pins 126 of the door 114 have linearly slid passed the second recessed channel 132 and the second detent 128 in a direction where the door 114 is being opened, the door 114 is not removable from the housing 101, because the hinge pins 126 are enclosed by the first recessed channel 130. In the opened position, however, the door 114 may be pivoted about the hinge pins 126, thereby providing a user of the housing assembly 100 access to the first opening 105 to insert or remove, for example, a battery to operate the selective call receiver included in the housing assembly 100. Similarly, in the closed position, once the door 114 has bypassed the second recessed channel 132, the door 114 is not removable from the housing 101. Only by careful placement of one of the hinge pins 126 at the second recessed channel 132 can a user remove the door 114 from the housing 101. For illustration, FIGS. 10–12 show a block diagram of the housing assembly 100 with the door 114 in closed, opened, and pivoting positions, respectively, according to the present invention.

It should be evident from the descriptions of FIGS. 1–12 that the present invention is advantageous over the prior art. Particularly, the present invention overcomes the disadvantages of the prior art by eliminating a dedicated lock switch for locking the door 114 in the closed position, thereby improving the aesthetic quality of the housing assembly. It will be appreciated that although the function of the battery door lock switch has been moved to button 108, button 108 preferably serves a dual function. That is, it serves the purpose of engaging and disengaging the door 114, and also serves as a user control for controlling the operation of the selective call receiver included in the housing assembly 100. An explanation of the operation of the selective call receiver follows.

Figure 13:
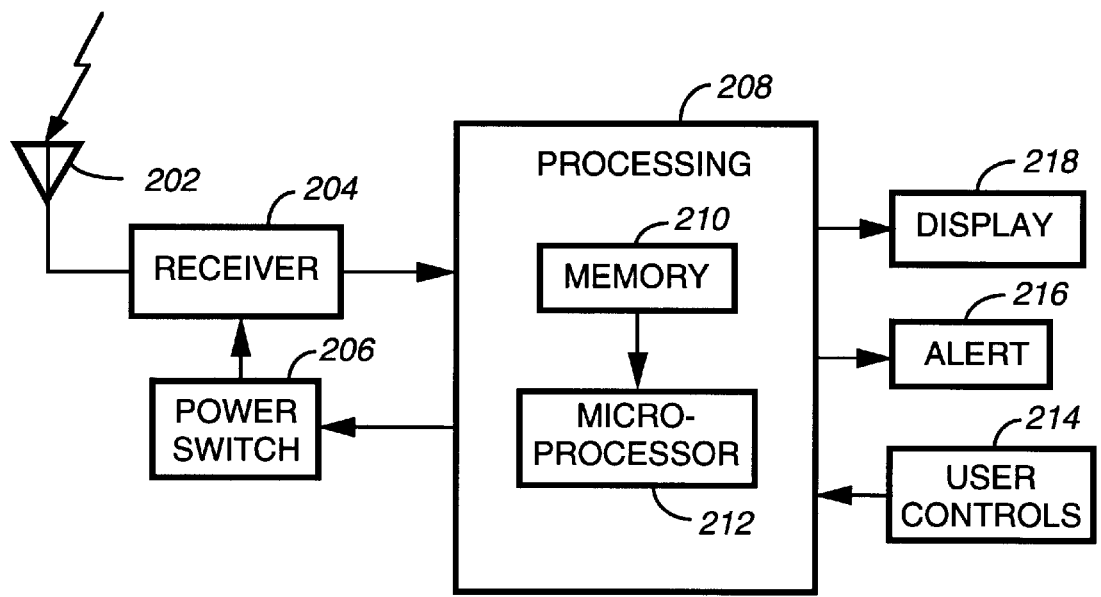
FIG. 13 shows an electrical block diagram of a SCR (selective call receiver) included in the assembly of FIG. 1 according to the present invention.

FIG. 13 shows an electrical block diagram of a SCR 200 (selective call receiver) included the housing assembly 100 of FIG. 1 according to the present invention. The SCR 200 comprises an antenna 202 for intercepting RF (Radio Frequency) signals from, for example, a radio communication system (not shown). The antenna 202 is coupled to a receiver 204 employing conventional demodulation techniques for receiving the communication signals transmitted by the radio communication system. Radio signals received by the receiver 204 produce demodulated information, which is coupled to a processor 208 for processing received messages. A conventional power switch 206, coupled to the processor 208, is used to control the supply of power to the receiver 204, thereby providing a battery saving function.

To perform the necessary functions of the SCR 200, the processor 208 includes a microprocessor 212, and a memory 210 including a random access memory (RAM), a read-only memory (ROM), and an electrically erasable programmable read-only memory (EEPROM). Preferably, the processor 208 is similar to the M68HC08 micro-controller manufactured by Motorola, Inc. It will be appreciated that other similar processors can be utilized for the processor 208, and that additional processors of the same or alternative type can be added as required to handle the processing requirements of the processor 208.

The processor 208 is programmed by way of the ROM to process incoming messages transmitted by the radio communication system. The processor 208 decodes an address in the demodulated data of the received message, compares the decoded address with one or more addresses stored in the EEPROM, and when a match is detected, proceeds to process the remaining portion of the message. Once the processor 208 has processed the message, it stores the message in the RAM, and a call alerting signal is generated to alert a user that a message has been received. The call alerting signal is directed to a conventional audible or tactile alerting device 216 for generating an audible or tactile call alerting signal.

The message can be accessed by the user through user controls 214 (i.e., buttons 108, 103), which provide functions such as lock, unlock, delete, read, etc. More specifically, by the use of appropriate functions provided by the user controls 214, the message is recovered from the RAM, and conveyed to the user by way of a display 218, e.g., a conventional liquid crystal display (LCD). The display is located at opening 118 of the housing assembly 100. It will be appreciated that, additionally, the display 218 can be accompanied by an audio circuit (not shown) for conveying voice messages.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. A housing assembly, comprising:
    a housing having a first opening;
    a door coupled to the housing at the first opening, wherein the door is slidable between opened and closed positions with the housing;
    a first latch coupled to the door, the first latch having a first detent;
    a second latch coupled to the housing, the second latch having an aperture for engaging with the first detent of the first latch in the closed position;
    a button coupled to the housing and coupled to the second latch, wherein depression of the button disengages the first and second latches from each other, thereby permitting the door to slide to the opened position;
    a first recessed channel located at opposite ends of the housing; and
    a hinge pin located at opposite ends of the door for engaging with the first recessed channel.

2. The housing assembly as recited in claim 1, further comprising a second detent coupled to the first recessed channel to prevent removal of the door from the housing.

3. The housing assembly as recited in claim 2, further comprising a second recessed channel coupled orthogonally to the first recessed channel, wherein positioning the hinge pin at the second recessed channel allows for removal of the door from the housing.

4. A housing assembly, comprising:
    a housing having a first opening;
    a door coupled to the housing at the first opening, wherein the door is slidable between opened and closed positions with the housing;
    a first latch coupled to the door, the first latch having a detent;

a second latch coupled to the housing, the second latch having an aperture for engaging with the detent of the first latch in the closed position;

a button coupled to the housing and coupled to the second latch, wherein depression of the button disengages the first and second latches from each other, thereby permitting the door to slide to the opened position;

a spring coupled to the second latch and the button, whereby the spring resiliently biases the second latch and the button for engagement with the detent of the first latch;

a wall coupled to the housing and orthogonally coupled to the second latch to prevent torque of the second latch;

a recessed channel located at opposite ends of the housing; and a hinge pin located at opposite ends of the door for engaging with the recessed channel.

5. The housing assembly as recited in claim 4, further comprising a selective call receiver.

* * * * *